(12) United States Patent
Korenblit et al.

(10) Patent No.: US 7,430,074 B2
(45) Date of Patent: Sep. 30, 2008

(54) GENERATION OF TERAHERTZ WAVES

(75) Inventors: Yehiel Korenblit, Netanya (IL); Boris G. Tankhilevich, Walnut Creek, CA (US)

(73) Assignee: Terahertz Technologies, LLC, Walnut Creek, CA (US)

( * ) Notice: Subject to any disclaimer, the term of this patent is extended or adjusted under 35 U.S.C. 154(b) by 0 days.

(21) Appl. No.: 11/481,197

(22) Filed: Jul. 3, 2006

(65) Prior Publication Data

US 2008/0002744 A1    Jan. 3, 2008

(51) Int. Cl.
*H01S 4/00* (2006.01)
*H01S 3/00* (2006.01)

(52) U.S. Cl. .................. 359/342; 372/37; 372/43.01

(58) Field of Classification Search ............. 359/342; 372/37, 43.01
See application file for complete search history.

(56) References Cited

U.S. PATENT DOCUMENTS

| | | | | |
|---|---|---|---|---|
| 3,986,194 A * | 10/1976 | Masumoto et al. | ........ | 372/44.01 |
| 4,914,665 A * | 4/1990 | Sorin | ............ | 372/20 |
| 2004/0094801 A1* | 5/2004 | Liang et al. | ........ | 257/347 |
| 2005/0242287 A1* | 11/2005 | Hakimi | ........ | 250/363.09 |
| 2006/0060815 A1* | 3/2006 | Punnoose | ........ | 252/62.56 |
| 2006/0108619 A1* | 5/2006 | Yoshida et al. | ........ | 257/295 |

OTHER PUBLICATIONS

M. W. Shaper and T. R. McGuire, "Studies of Curie-Point Increases in EuO", Journal of Applied Physics, Feb. 1968, pp. 588-590, vol. 39, No. 2.

M. I. Kaganov and V. M. Tsukernik, "NonResonance Absorption of Oscillating Magnetic Field Energy by a Ferromagnetic Dielectric", Soviet Physics JETP, Mar. 1960, pp. 587-592, vol. 37 (10), No. 3.

V. G. Vaks, A. I. Larkin, and S. A. Pikin, "Spin Waves and Correlation Functions in a Ferromagnetic", Zh. Eksp. Teor. Fiz. (U.S.S.R.) 53, 1089-1106 (Sep. 1967), pp. 647-655.

I. YA. Korenblit and B. G. Tankhilevich, "High Frequency Magnon Generation by NonEquilibrium Electrons And The Instability Of The Magnon System", Physics Letters, pp. 307-308, Voll. 64A, No. 3.

I. YA. Korenblit and B. G. Tankhilevich, "Generation of High-Frequency Magnons In A Ferromagnetic Semiconductor", Pis'ma Zh. Eksp. Teor. Fiz. 24, No. 11, pp. 598-601 (Dec. 5, 1976).

I. YA. Korenblit and B. G. Tankhilevich, "Generation Of High-Frequency Magnons by NonEquilibrium Electrons Polarized Opposite To The Direction Of Magnetization", Soviet Physics JETP, Dec. 1977, pp. 1167-1175, vol. 46, No. 6.

I. YA. Korenblit, A. A. Samokhvalov and V. V. Osipov, "Heating And Generation Of Magnons By NonEquilibrium Electrons In Ferromagnetic Semiconductors", Soc. Sci. Re. A. Phys., 1987, pp. 447-517, vol. 8, Harwood Academic Publisher GmbH.

(Continued)

*Primary Examiner*—Jack W. Keith
*Assistant Examiner*—Eric Bolda
(74) *Attorney, Agent, or Firm*—Boris G. Tankhilevich (57) ABSTRACT

A method of THz photon generation comprising: providing a magnon gain medium; wherein the magnon gain medium supports generation of nonequilibrium magnons; and injecting nonequilibrium electrons into the magnon gain medium. Propagation of nonequilibrium electrons in the magnon gain medium causes generation of nonequilibrium magnons. Interaction between nonequilibrium magnons causes generation of THz photons.

26 Claims, 3 Drawing Sheets

OTHER PUBLICATIONS

L. Passell, O. W. Dietrich and J. Als-Nielsen, "Neutron Scattering From The Heisenberg Ferromagnets EuO and EuS. I. The Exchange Interactions", Physical Review B, Dec. 1, 1976, pp. 4897-4907, vol. 14, No. 11.

J. Schoenes and P. Wachter, "Exchange Optics In Gd-doped EuO", Physical Review B, Apr. 1, 1974, pp. 3097-3105, vol. 9, No. 7.

M. Dyakonov and M. Shur, "Shallow Water Analogy For A Ballistic Field Effect Transistor: New Mechanism Of Plasma Wave Generation By dc Current", Physical Review Letters, Oct. 11, 1993, pp. 2465-2468, vol. 71, No. 15.

J.P. Lascaray, J.P. Desfours and M. Averous, "Bound Magnetic Polaron Evidence In EuO", Solid State Communications, 1976, pp. 677-679, vol. 19, Pergamon Press.

R. Huber, B.A. Schmid, Y.R. Shen, D.S. Chemla, and R.A. Kaindl, "Stimulated Terahertz Emission From Intraexcitonic Transitions In Cu2O", Physical Review Letters, Jan. 13, 2006, pp. 017402-1 to 017402-4, PRL. 96, The American Physical Society.

Bradley Ferguson and Xi-Cheng Zhang, "Materials for Terahertz Science and Technology", Nature Materials, Sep. 2002, pp. 26-33, vol. 1, Nature Publishing Group.

R. Kohler, A. Tredicucci, F. Beltram, H.E. Beere, E.H. Linfield, A.G. Davies, D.A. Ritchie, R.C. Iotti and F. Rossi, "Terahertz Semiconductor-heterostructure Laser", Letters To Nature, May 9, 2002, pp. 156-159, vol. 417, Macmillian Magazines Ltd.

\* cited by examiner

GENERATION OF TERAHERTZ WAVES

TECHNICAL FIELD

The current invention relates to generation of Terahertz waves.

BACKGROUND ART

Terahertz (THz) radiation, an electromagnetic radiation in a frequency interval from 0.1 THz to 10 THz, occupies the portion of the electromagnetic spectrum between the microwave band and the infrared band.

A THz photon has an energy that is less than the energy of an optical photon. That is why THz-ways can penetrate deep into the substance where the optical waves can not penetrate. At THz frequencies the molecules vibrate. That is why THz waves are useful in the study of molecules.

Indeed, the unique rotational and vibrational responses of molecules within the THz range provide information that is generally absent in optical, X-ray and NMR images. A THz wave can easily penetrate and inspect the insides of most dielectric materials, which are opaque to visible light and low contrast to X-rays, making THz waves a useful complementary imaging source.

For example, THz waves maintain reasonable penetration depth in certain common materials, such as clothes, plastic, wood, sand and soil. Therefore, THz technology has the potential to detect explosives packaged or buried within these materials because the explosives have unique THz spectral properties when compared to the surrounding materials. The spectral fingerprints of explosive materials can be expected in the THz band, and THz imaging can be applied for landmine detection.

However, at present, efficient, compact, solid-state sources for the spectral range 0.1-10 THz are still lacking.

Indeed, broadband pulsed THz sources are usually based on the excitation of different materials with ultra short laser pulses. A number of different mechanisms have been exploited to generate THz radiation, including photo carrier acceleration in photo conducting antennas, second-order non-linear effects in electro-optic crystals etc. Currently, conversion efficiencies in all of these sources are very low, and consequently, the beam powers are in the nanowatt to microwatt range, whereas the aver age power of the femtosecond optical source is of order of 1 W.

For narrowband THz sources, solid-state lasers are often considered. They are based on inter-band transitions in narrow gap semiconductors or on inter subband transitions, i.e. transitions in quantum confined structures, e.g. nanostructures, between confined conduction or valence states. To get THz radiation from direct inter band transitions, near zero gap semiconductors are required. For inter subband transitions conventional wide gap materials can be used, but require precise complicated structures. At present the construction of multiple quantum-well semiconductor structures for laser emission is feasible. The quantum cascade consists of a repeating structure, in which each repeat unit is made up of an injector and an active region. In the active region a population inversion exists and electron transition to a lower energy level occurs, emitting photons at a specific wavelength. Recently Kohler et al. (R. Kohler et al., Nature 417, 156 (2002)) designed a THz quantum cascade laser operating at 4.4 THz. The laser consisted of a total over 700 quantum wells, and demonstrated pulse operation at temperature of 10 K. For a review, please see, e.g., B Ferguson and X.-C. Zhang, Nat. Matter, 26 (2002).

Recently M. Dyakonov and M. S. Shur have proposed to use plasma wave electronics for THz applications. Please, see Phys. Rev. Lett. 71, 2465 (1993). They argued that a channel of a field effect transistor might act as a resonance cavity for the plasma waves. For micron or sub-micron gate length, the fundamental frequency of this cavity is in the THz range. Since electromagnetic radiation can excite plasma waves, such a device can be used for the resonance detection and mixing of electromagnetic radiation at THz frequencies. Under certain conditions the steady state with a dc current in the field effect transistor is unstable against spontaneous generation of plasma waves, which in his turn should lead to generation of electromagnetic radiation. The plasma instability can, however, be suppressed if there are appreciable losses at the contacts.

The stimulated Terahertz emission from inter-exitonic transitions in $Cu_2O$ was also observed. Please, see R. Hubes, B. Schmid, Y. Ron Shen, D. S. Chemla and R. A. Kindl, Phys. Rev. Lett., 96, 017402 (2006).

DISCLOSURE OF THE INVENTION

The present invention provides a method and an apparatus for generation of THz photons.

One aspect of the present invention is directed to a method of THz photon generation.

In one embodiment, the method of the present invention comprises the following steps: (A) providing a magnon gain medium; wherein the magnon gain medium supports generation of nonequilibrium magnons; and (B) generating the nonequilibrium magnons in the magnon gain medium; wherein interaction between the nonequilibrium magnons causes generation of photons.

In one embodiment of the present invention, the step (A) further comprises: (A1) placing the magnon gain medium in a thermostat to maintain temperature of the magnon gain medium below a critical temperature.

In one embodiment of the present invention, the step (A) further comprises: (A2) selecting the magnon gain medium from the group consisting of: {ferromagnetic semiconductor; ferromagnetic isolator; and ferromagnetic material}.

In one embodiment of the present invention, the step (A2) further comprises: (A2, 1) placing the magnon gain medium comprising the selected ferromagnetic material in the thermostat to maintain temperature of the selected ferromagnetic material below its Curie temperature.

In one embodiment of the present invention, the step (B) further comprises: (B1) injecting nonequilibrium electrons into the magnon gain medium; wherein propagation of the nonequilibrium electrons in the magnon gain medium causes generation of the nonequilibrium magnons; and wherein interaction between the nonequilibrium magnons causes generation of photons.

In one embodiment of the present invention, the step (B1) further comprises: pumping nonequilibrium electrons into the magnon gain medium.

In one embodiment of the present invention, the step (B1) further comprises: pumping polarized nonequilibrium electrons into the magnon gain medium.

In one embodiment of the present invention, the step (B1) further comprises: pumping substantially sufficient number of polarized nonequilibrium electrons into the magnon gain medium to cause generation of the nonequilibrium magnons in the magnon gain medium.

In one embodiment of the present invention, the step (B1) further comprises: pumping a threshold number of polarized nonequilibrium electrons into the magnon gain medium, wherein the threshold number of pumped polarized nonequilibrium electrons is substantially sufficient to generate a magnon avalanche effect in the magnon gain medium.

In one embodiment of the present invention, the step (B1) further comprises: changing a maximum frequency of the generated photons by changing critical temperature of the magnon gain medium; wherein the critical temperature of the magnon gain medium depends on an external parameter; and wherein the external parameter is selected from the group consisting of: {an external pressure; and a concentration of impurities in the magnon gain medium}.

In one embodiment of the present invention, the step (B1) further comprises: changing an operating frequency of the generated photons; wherein the operating frequency of the generated photons depends on an external parameter; and wherein the external parameter is selected from the group consisting of: {energy of the injected electrons; and an operating temperature of the thermostat}.

In one embodiment of the present invention, the step (B1) further comprises: (B2) generating THz photons by using a merging process between the nonequilibrium magnons in the magnon gain medium.

In one embodiment, the method of the present invention further comprises: (C) manipulating photon reflection coefficient of the generated photons at surface area of the magnon gain medium by using reflective and transmission means attached to the surface area of the magnon gain medium.

In one embodiment of the present invention, the step (C) further comprises: (C1) selecting the reflective and transmission means from the group consisting of: {an optical cavity; and a Fabry-Perot cavity}.

In one embodiment of the present invention, the step (C) further comprises: (C2) accumulating the generated photons in the magnon gain medium by using the reflective and transmission means attached to the surface area of magnon gain medium.

In one embodiment of the present invention, the step (C2) further comprises: accumulating a threshold number of the generated photons in the magnon gain medium, wherein the threshold number of accumulated photons is substantially sufficient for nonlinear photon-photon interaction process.

In one embodiment, the method of the present invention further comprises: (D) utilizing a waveguide attached to the magnon gain medium to output the generated photons outside the magnon gain medium.

In one embodiment of the present invention, the step (D) further comprises: (D1) accumulating the generated photons in an outside optical cavity attached to the waveguide.

In one embodiment of the present invention, the step (D) further comprises: (D2) accumulating a threshold number of generated photons in the outside optical cavity attached to the waveguide, wherein the threshold number of accumulated photons is substantially sufficient for nonlinear photon-photon interaction process.

Another aspect of the present invention is directed to an apparatus for THz photon generation.

In one embodiment, the apparatus of the present invention comprises: (A) a magnon gain medium; wherein the magnon gain medium supports generation of nonequilibrium magnons; and (B) a means for generating the nonequilibrium magnons in the magnon gain medium; wherein interaction between the nonequilibrium magnons causes generation of photons.

In one embodiment of the present invention, the means (B) further comprises: (B1) a means for injecting nonequilibrium electrons into the magnon gain medium; wherein propagation of the nonequilibrium electrons in the magnon gain medium causes generation of the nonequilibrium magnons; and wherein interaction between the nonequilibrium magnons causes generation of photons.

In one embodiment of the present invention, the means (B1) further comprises: a means for pumping nonequilibrium electrons into the magnon gain medium.

In one embodiment of the present invention, the means (B1) further comprises: a means for pumping polarized nonequilibrium electrons into the magnon gain medium.

In one embodiment, the apparatus of the present invention further comprises: (C) a thermostat, wherein the magnon gain medium is placed in the thermostat, and wherein the thermostat is configured to maintain temperature of the magnon gain medium below a critical temperature.

In one embodiment, the apparatus of the present invention further comprises: (D) a reflective and transmission means attached to surface area of the magnon gain medium, wherein the reflective and transmission means are configured to manipulate the reflection coefficient of the generated photons at the surface area of the magnon gain medium, and wherein the reflective and transmission means are selected from the group consisting of: {the optical cavity; and the Fabry-Perot cavity}.

In one embodiment, the apparatus of the present invention further comprises: (E) a waveguide attached to the magnon gain medium, wherein the waveguide is configured to output the generated photons outside the magnon gain medium.

In one embodiment, the apparatus of the present invention further comprises: (F) an outside optical cavity attached to the waveguide, wherein the outside optical cavity is configured to accumulate the generated photons.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference now will be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific-details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of particles and quasi-particles interactions, procedures, equations, blocks, diagrams, and other symbolic representations of physical processes. These descriptions and representations are the means used by those skilled in the art of physics of condensed matter to most effectively convey the substance of their work to others skilled in the art.

I. General Idea

The electrons in a ferromagnetic semiconductor can be divided into two groups: free electrons, which determine the electrical conductivity of the semiconductor, and electrons localized at the ions (d- or f-electrons), which determine its magnetic properties.

The main interaction between these two groups of electrons is the exchange interaction, which lift the spin degeneracy of the electrons. The conduction (valence band) splits into two subbands with spin up (along the magnetization) and spin down, with an exchange gap $\Delta=2I<S_z>$, where I is the exchange energy of the conduction electrons and the localized spins, and $<S_z>$ is the mean value of the localized spins. At temperatures much lower than the Curie temperature, Tc, the mean value of the localized spins $<S_z>$ is temperature independent: $<S_z>=S$.

The exchange gap $\Delta$ is usually larger than 0.1 eV. For example, for EuO the exchange gap is: $\Delta=0.6$ eV. For the reference, please see: J. Lascaray, J. P. Desfours, and M. Averous, Sol. St. Com. 19, 677 (1976).

Figure 1:
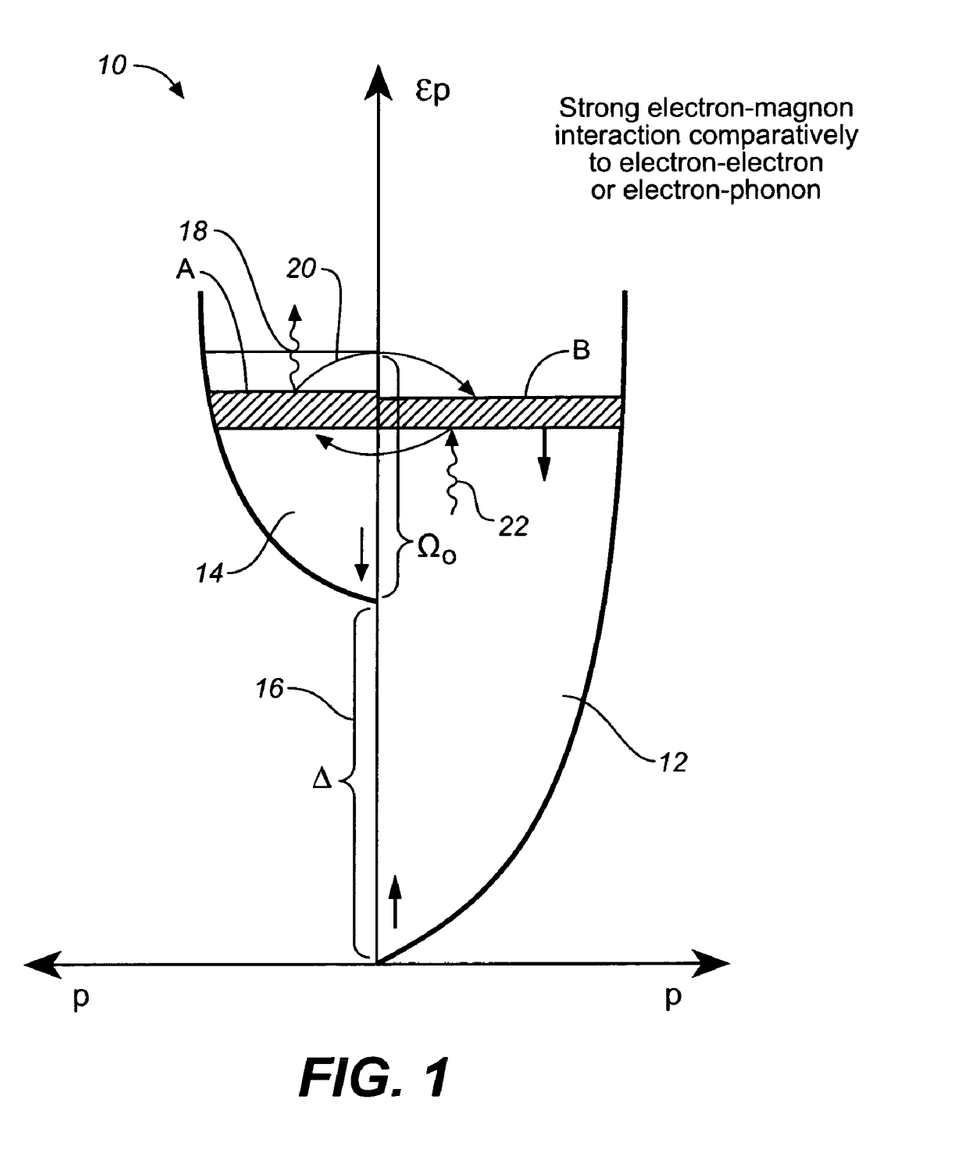
FIG. 1 illustrates process of strong electron-magnon interaction (comparatively with electron-electron or with electron-phonon interaction) wherein a nonequilibrium electron put in the upper subband with spin down rapidly emits a magnon with a large wave vector for the purposes of the present invention.

If the exchange energy is positive, I>0, then the bottom of the subband with spin up 12 is located below the bottom of the subband with spin down 14 (FIG. 1). Usually in ferromagnetic semiconductors the gap $\Delta$ 16 (of FIG. 1) is much larger than the maximum of $\{Tc, E_f\}$, where $E_f$ is the Fermi energy of the electrons. Therefore, only the states in the lower subband are occupied in equilibrium, i.e. the electrons are fully polarized.

A nonequilibrium electron 20 put in the upper subband with spin down rapidly emits a magnon 18, with a large wave vector $q \approx \hbar^{-1} (2 m\Delta)^{1/2}$, where m is the electron effective mass. It follows from the energy and momentum conservation laws that if the energy of this electron, $\epsilon_p$, measured from the bottom of the spin down subband is much smaller than $\Delta$, the wave vector of the emitted magnon, q lies in the interval $q_1 \leq q \leq q_2$, where $q_{1,2}=\hbar^{-1} (p_0 \pm p)$, $p_0=(2 m \Delta)^{1/2}$, $p=(2 m \epsilon_p)^{1/2} << p_0$. The frequency of these magnons may be in the Terahertz region.

For EuO, the values of electron mass m are inconsistent according to different references. According to one reference, (J. Shoenes and P. Wachter, Phys. Rev. B 9, 3097 (1974)), $m=0.35 m_0$, $m_0$ is the free electron mass, and the wave vector of the exited magnons $q \approx q_0 = \hbar^{-1} p_0 = 2.6 \ 10^7$ cm$^{-1}$. The spin-wave stiffness $D=10.8 \ 10^{-16}$ mev·cm$^2$. (Please, see L. Passel, O. W. Dietrich and J. Als-Nielsen, Phys. Rev. B 9, 3097, 1974). This gives the energy of the exited magnons $\hbar\omega=Dq^2=0.73$ meV, and the frequency $f_m=\omega/2\pi=0.19$ THz. Merging of two magnons with frequency f and wave vectors $\vec{q}$ and $(-)\vec{q}$ generates a photon with frequency 2f (for the reference, please see M. I. Kaganov and V. M. Tsukernik, Sov. Phys. -JETP 37, 587 (1960)). Thus, in the above given example, the frequency of the emitted radiation is: $f_r=2f_m=0.38$ THz.

On the other hand, according to another reference (I. Ya. Korenblit, A. A. Samokhvalov and V. V. Osipov, in Sov. Sc. Rev. A, Physics, 8, 447. Harwood Ac. Publ., UK, 1987), the electron mass value in EuO is quite different: $m=1.5 \ m_0$. If this is the case, one obtains a quite different value for the radiation frequency: $f_r=1.6$ THz.

More generally, consider a ferromagnetic semiconductor with $\Delta \approx 0.2$ eV, and $m=0.3 \ m_0$. Then we have $q_0=1.4 \ 10^7$ cm$^{-1}$. The magnon frequency $\hbar\omega(q_0) \approx kTc \ (q_0 a)^2$, where k is the Boltzman constant, and $\alpha$ is the lattice constant. With $Tc \approx 100\text{-}300$ K and $\alpha \approx 3\text{-}5 \times 10^{-8}$ cm, the magnon frequency is $f_m \approx 1.6$ THz, and the radiation frequency $f_r \approx 2.0$ THz.

The ratio of the magnon generation rate, $\Gamma_e(\vec{q})$, to the rate of $\Gamma_m(\vec{q})$, their relaxation (in collisions with equilibrium magnons) is a function of the wave vector $\vec{q}$. Therefore the nonequilibrium magnon distribution function, $N(\vec{q})$ has a maximum at some wave vector $\vec{q}=\vec{q}^*$. $N(\vec{q})$ increases with the increase of the electron pumping, and because of the simulated emission of magnons, the function $N(\vec{q})$ grows most rapidly at $\vec{q}$ close to $\vec{q}^*$. When the pump reaches some critical value, $N(\vec{q}^*)$ starts to increase very fast with the increase of the electron pumping. At some conditions the generation of magnons with $\vec{q}=\vec{q}^*$ becomes avalanche-like, and the magnon system becomes unstable. For more details, please see references: I. Ya. Korenblit and B. G. Tankhilevich, Sov. Phys. -JETP, 46, 1167 (1977); I. Ya. Korenblit and B. G. Tankhilevich, Sov. Phys. -JETP Lett. 24, 555 (1976); I. Ya. Korenblit and B. G. Tankhilevich, Phys. Lett. A 64, 307 (1977), and equations below. As a result an intense Terahertz radiation can be obtained.

II. Basic Equations for Magnon Generation.

The system of equations which govern the behavior of the electron, $f_\downarrow(\vec{p})$, and magnon, $N(\vec{q})$ distribution functions were obtained in the following paper: I. Ya. Korenblit and B. G. Tankhilevich, Sov. Phys. -JETP, 46, 1167 (1977). They read $$[1+N(\vec{q})]\Gamma_e(\vec{q}) - [N(\vec{q})-N^{(0)}(\vec{q})]\Gamma_m(\vec{q})=0$$

$$f_\downarrow(\vec{p})\gamma_{em}(\vec{p})=g(\epsilon_p). \qquad \text{(Eqs. 1)}$$

Here $\Gamma_e(\vec{q})$ is the rate of relaxation of magnons in collisions with electrons $$\Gamma_e(\vec{q})=4\pi\hbar^{-1}I^2Sv_0\int d^3p(2\pi\hbar)^{-3}\delta(\gamma_\uparrow(\vec{p}-\hbar\vec{q})|$$

$$\epsilon_{\vec{p}\downarrow}-\hbar\omega_{\vec{q}}-\epsilon_{\vec{p}-\hbar\vec{q},\uparrow})f_\downarrow(\vec{p}), \qquad \text{(Eq. 2)}$$

where $v_0$ is the unit cell volume.

$\gamma_{em}$ is the electron-magnon relaxation rate:

$$\gamma_{em}(\vec{p})=4\pi\hbar^{-1}I^2Sv_0\int d^3q(2\pi\hbar)^{-3}\delta(\gamma_\uparrow(\vec{p}-$$

$$\hbar\vec{q})|\epsilon_{\vec{p}\downarrow}-\hbar\omega_{\vec{q}}-\epsilon_{\vec{p}-\hbar\vec{q},\uparrow})(1+N(\vec{q})), \qquad \text{(Eq. 3)}$$

The "smeared" $\delta$-function, $\delta(\gamma|\epsilon)$, takes into account the finite lifetime of the electrons in the final state, caused by the interaction with optical phonons, which may be strong in ferromagnetic semiconductors, with an essential ionicity contribution to the chemical bonds. We have $$\delta(\gamma|\varepsilon) = \frac{1}{\pi} \frac{\hbar\gamma}{(\varepsilon^2 + \hbar^2\gamma^2)} \quad \text{(Eq. 4)}$$

The rate $\gamma_\uparrow(p, \varepsilon_p)$ is the known electron damping rate due to the emission of longitudinal optical phonons (22 of FIG. 1). For electrons with energy $\varepsilon_p$ close to $\Delta$, this rate is given by $$\gamma\uparrow(\varepsilon_p) = (\pi/2)\alpha\Omega(\Omega/\Delta)^{1/2} ln(4\Delta/\Omega) << \Delta. \quad \text{(Eq. 5)}$$

Here $\Omega$ is the energy of an optical phonon, and $\alpha$ is the strength of the electron-phonon interaction.

The function $g(\varepsilon)$ is the generation function of electrons, with spin down. We shall treat it as a $\delta$-function $$g(\varepsilon_p) = g_0 \varepsilon \delta(\varepsilon - \varepsilon_p). \quad \text{(Eq. 6)}$$

We suppose in what follows that the energy $\varepsilon$ is small, $\varepsilon << \Delta$.

The second term in the l.h.s. in the first of Eqs. (1) describes the relaxation of non-equilibrium magnons in collisions with equilibrium ones, under the assumption that $N(\vec{q})$, is close to its equilibrium value, $$N^{(0)}(\vec{q}) = [e^{(\hbar\omega_q/kT)} - 1]^{-1}. \quad \text{(Eq. 7)}$$

$\Gamma_m(\vec{q})$ is the magnon-magnon relaxation rate. From Eqs. (1) we obtain the following integral equation for $N(\vec{q})$, $$N(\vec{q}) = (N^0(\vec{q}) + \Gamma_e(\vec{q})/\Gamma_m(\vec{q}))(1 - \Gamma_e(\vec{q})/\Gamma_m(\vec{q}))^{-1}, \quad \text{(Eq. 8)}$$

where $$\Gamma_e(\vec{q}) = g_{0\varepsilon} \int d^3p \delta(\gamma_\uparrow(\vec{p} - \hbar\vec{q})|\varepsilon_{p\downarrow} - \hbar\omega_q - \varepsilon_{p-\hbar\vec{q},\uparrow}) \delta(\varepsilon - \varepsilon_p) Z^{-1}(\vec{p}), \quad \text{(Eq. 9)}$$

and $$Z(\vec{p}) = \int d^3q \delta(\gamma_\uparrow(\vec{p} - \hbar\vec{q})|\varepsilon_{p\downarrow} - \hbar\omega_q - \varepsilon_{p-\hbar\vec{q},\uparrow})(1 + N(\vec{q})). \quad \text{(Eq. 10)}$$

Eq. (8) is formally reminiscent of the expression for the magnon distribution function under conditions of parametric pumping. The difference is that here the rate $\Gamma_e$ is itself a functional of $N(\vec{q})$, since the number of the emitted magnons depends on the distribution function of the electrons with spin down, $f_\downarrow$, which according to Eqs. (2) and (3) is in its turn determined not only by the pump $g(\varepsilon_p)$ but also by a certain average (10) over the magnon distribution function. The behavior of $N(\vec{q})$ is therefore different from that in the case of parametric pumping.

III. $N(\vec{q})$ for Strong Pumping

A. Isotropic Magnons

Let us assume for simplicity that the magnon and electron spectra are isotropic. Then $\Gamma_e(q)$ and $\Gamma_m(q)$ do not depend on the direction of $\vec{q}$.

The relaxation rate $\Gamma(q)$ is usually a power function of q, and it can be written as $$\Gamma_m(q) = \Gamma_m(p_0)(\hbar q/p_0)^t. \quad \text{(Eq. 11)}$$

More specifically, if $\Gamma_m(q)$ is determined by magnon-magnon exchange scattering, then $t=4$ for magnons, with energy $\hbar\omega(q_0)$ larger than kT, and $t=3$ for magnons, with energy $\hbar\omega(q_0)$ smaller than kT.

The strong pumping regime sets in, when $g_0$ exceeds a critical value $G_c$. If the damping of electrons by optical phonons is less than $(\varepsilon\Delta)^{1/2}$, this critical value is given by $$G_c = 2g_c/(t+1),$$

$$g_c = (\Delta/\varepsilon)^{3/2} \Gamma_m(q_0)[1 + N^{(0)}(q_0)]. \quad \text{(Eqs. 12)}$$

At $g_0 > G_c$ the function $N(q)$ increases exponentially with pumping $$N(q) = [1 + N^{(0)}(q_0)](p_0/2p_\varepsilon(t+1))\exp(g_0/G_c), \quad \text{(Eq. 13)}$$

if q falls into the smooth region $$p_0 - p_\varepsilon \leq \hbar q \leq p_0 - p_\varepsilon + \delta\hbar q,$$

$$\delta\hbar q = 2p_\varepsilon \exp(-g_0/G_c), \quad \text{(Eqs. 14)}$$

while N(q) with wave vectors outside of the above-given range does not depend on the pump.

Thus, under sufficiently strong pumping the magnon distribution function has a sharp peak at $\hbar q \approx p_0 - p_\varepsilon$.

Let us define the number of electrons, $\beta$, pumped per second per unit cell as:

$$\beta = v_0(2\pi\hbar)^{-3} \int d^3p g(\varepsilon_p). \quad \text{(Eq. 15)}$$

One gets for the pumping given by Eq. (6)

$$\beta = (v_0 \varepsilon^{3/2} m^{3/2} g_0/2^{1/2} \pi^2 \hbar^3) \quad \text{(Eq. 16)}$$

and the critical pumping $\beta_c$, with $g_0 = G_c$ is $$\beta_c = (v_0 q^3_0/(2(t+1)\pi^2))\Gamma_m(q_0)[1 + N^{(0)}(q_0)]. \quad \text{(Eq. 17)}$$

Since we are interested in high-frequency magnons, we suppose that their relaxation is mainly due to four-magnon exchange interaction. Using the expressions for $\Gamma_m$ given in the following reference (V. G. Vaks, A. I. Larkin and S. A. Pikin, JETP 53 (1967)), we estimated for T/Tc≈0.2, and $\hbar\omega(q_0) > kT$, $N^{(0)}(q_0) << 1$: $\Gamma_m \approx 10^8 - 10^9$ sec$^{-1}$.

Thus, it follows from Eq. (17) the estimate $\beta_c \approx 10^5 - 10^7$ sec$^{-1}$, and we took into account that $N^{(0)}(q_0)$ is small.

To get a sense of these estimates, we consider a model, in which the spin-down electrons are emitted into their active region across the surface area 1 cm$^2$. The lattice constant $\alpha$ of EuO is approximately $5 \times 10^{-8}$ cm, i.e. the unit cell volume is approximately $v_0 \approx 10^{-22}$ cm$^3$. The critical value $N^c \approx \beta_c \times v_0 \approx 10^{28} - 10^{29}$ cm$^{-3}$ sec$^{-1}$. This is the number of electrons, which should cross the edge in one second to achieve the critical number of emitted magnons in a volume of 1 cm$^3$. However, electrons will emit magnons at a short distance from the edge, which can be estimated in the following way.

The electron-magnon frequency $\gamma_{em}$ is of order $3 \times 10^{12} - 10^{13}$ sec$^{-1}$. The velocity of electrons with energy of order of $10^{-2}\Delta$ is $5 \times 10^6 - 10^7$ cm×sec$^{-1}$. This gives the mean free path of electrons with respect to magnon emission as: $l \approx 10^{-6}$ cm. Thus, all electrons entering a sample (including a magnon gain medium) across a selected side will emit magnons at this distance from that side. Therefore, only the region of width l is active, and we get for the current density $j = N_e \times 1$ electrons/sec×cm$^2$. The charge of an electron is $1.6 \times 10^{-19}$ Q. Taking into account that $1 \times Q/sec = 1$ A, we finally get: $j = 10^4 - 10^5$ A/cm$^2$. Current densities of order $10^5 - 10^6$ A/cm$^2$ are easy to achieve in semiconductors. In a pulse regime one can obtain current densities j as high as: $j = 10^9$ A/cm.

The physical meaning of the critical pumping $G_c$ can be understood as follows. The ratio $\Gamma_e/\Gamma_m$ of the rate of generation of the magnons to the rate of their relaxation reaches its maximum value at $\hbar q = p_0 - p_\varepsilon$ and has its minimum at $\hbar q = p_0 + p_\varepsilon$, i.e. there is an excess generation on the left end of the interval in comparison with the right end. Stimulated emission causes the increase of this asymmetry. Nonlinear generation begins when the difference between the number of non-equilibrium magnons at the ends of the generation interval becomes equal to the number of equilibrium magnons, if $N^{(0)}>1$. On the other hand, nonlinear generation begins when the difference between the number of non-equilibrium magnons at the ends of the generation interval becomes equal to 1, if the opposite inequality ($N^{(0)}<1$) holds.

Figure 2:
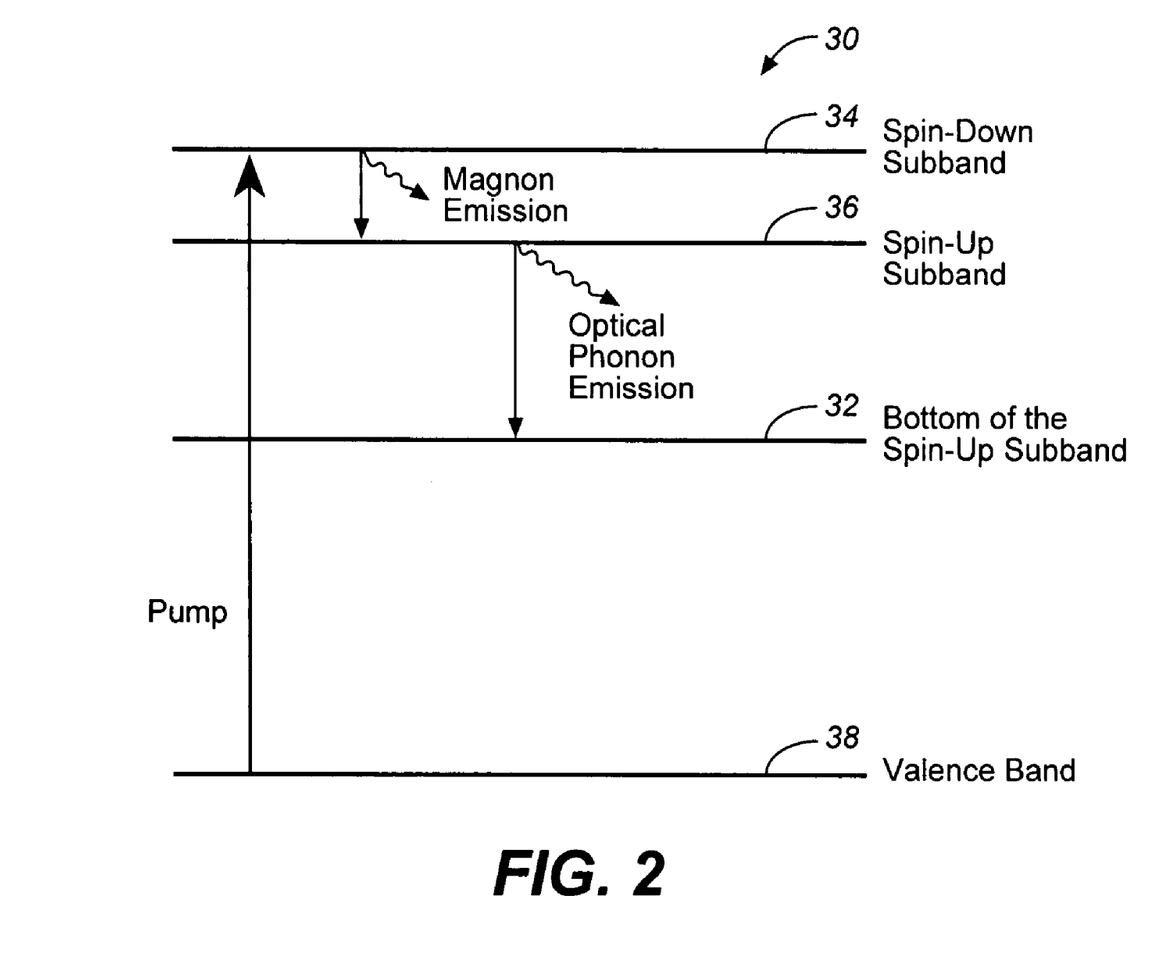
FIG. 2 shows a diagram that illustrates the method of magnon generation of the present invention in terms of a four-level laser effect.

FIG. 2 shows a diagram 30 that illustrates the method of magnon generation of the present invention in terms of a four-level laser effect. Indeed, the valence band corresponds to the lowest laser level 38. These electrons should be pumped into the spin-down subband, which corresponds to the laser's highest level 34. Then the electrons move into the lower energy states in the spin-up subband 36, each electron emitting a magnon. These last electron states correspond to the intermediate state in lasers. Electrons in the spin-up subband 36 move into the bottom of the spin-up subband 32 by emitting optical phonons.

If the electron damping due to optical phonon scattering is large, $\hbar\gamma_\uparrow >> (\epsilon\Delta)^{1/2}$, the critical pumping, $G'_c$ is smaller than gc given by Eq. (12).

$$G'_c = \pi g_c \gamma_\uparrow / \Delta. \quad \text{(Eq. 18)}$$

The function N (q) in the critical region increases as $g_0{}^2$, and the wave-vector interval of generated magnons decreases as $1/g_0$:

$$N(q) = [1 + N^{(0)}(q)](q_0/G'_c)^2. \quad \text{(Eq. 19)}$$

One should stress that only the main generation regimes are taken into account herein. More details can be found in the following reference: I. Ya. Korenblit and B. G. Tankhilevich, Sov. Phys. -JETP, 46, 1167 (1977).

B. Effect of Anisotropy. Instability of the Magnon System.

If the ratio of the generation rate $\Gamma_e(\vec{q})$ to the relaxation rate $\Gamma_m(\vec{q})$ depends on the direction of the wave vector $\vec{q}$, then in the nonlinear regime the stimulated emission of magnons results in the strong anisotropy of magnon distribution function. As an example, one can consider the anisotropy of $\Gamma_e(\vec{q})/\Gamma_m(\vec{q})$ caused by the anisotropy of the magnon spectrum. The spectrum of magnons with q close to $p_0/\hbar$ can be written as $$\omega_q = Dq^2(1 + \Lambda \sin^2 \theta), \quad \text{(Eq. 20)}$$

where $$\Lambda = 2\pi g\mu_B M_s/\omega_{p0} << 1, \quad \text{(Eq. 21)}$$

$M_s$ is the magnetization, $\theta_{\vec{q}}$ is the angle between the vectors $\vec{q}$ and $\vec{M}_s$. If the inequality $\hbar\omega(q_0) < kT$ holds, then the anisotropy of $\Gamma_e(\vec{q})/\Gamma_m(\vec{q})$ implies that the generation is the largest at some angle $\theta$.

Consider the situation, when the damping is large, i.e. $\hbar\gamma_\uparrow >> (\epsilon\Delta)^{1/2}$. Since the anisotropy is small ($\Lambda<<1$), the anisotropy becomes effective only at sufficiently strong pumping, larger than the critical one, Eq. (18). At $g=G_c$ given by this equation, the number of magnons starts to increase as in the isotropic case. If one assumes that the basic equations (Eqs. 1), describing the generation of magnons close to equilibrium, are valid also beyond the critical pumping, one can reveal the role of small anisotropy.

As shown in the following reference: I. Ya. Korenblit and B. G. Tankhilevich, Sov. Phys. -JETP, 46, 1167 (1977), the maximum generation takes place for magnons with θ close to zero and q close to $p_0$. If the pumping reaches the critical value g*

$$g^* = \pi^2 \hbar \gamma_\uparrow g_c / 2\Lambda^{1/2}\Delta, \quad \text{(Eq. 22)}$$

the function $N(\vec{q})$ becomes $$N(\vec{q}) = N^{(0)}(\vec{q})\left[1 + \Lambda\sin^2(\theta) - \frac{\hbar^2\gamma_\uparrow^2}{((\Delta-\epsilon_q)^4 + \hbar^2\gamma_\uparrow^2)}\left(\frac{p_0}{\hbar q}\right)^2\right]^{-1} \quad \text{(Eq. 23)}$$

where $\epsilon_q = \hbar^2 q^2/2$ m.

We get at $\hbar q = p_0$, i.e. at $\epsilon_q = \Delta$ $$N(\vec{q}) = N^{(0)}(\vec{q})/\Lambda \sin^2(\theta_{\vec{q}}) \quad \text{(Eq. 24)}$$

At θ=0 the denominator of this expression goes to zero. The steady solution of Eqs. (1) exists only at pumping levels below g*. When the pumping level reaches the critical value g*, an avalanche-type growth of the number of magnons occurs, whereas the wave vectors of these non-equilibrium anisotropic magnons are directed along the magnetization and are equal to $p_0$.

Note, that at sufficiently low temperatures the three-magnon dipole scattering may be more important then the discussed above four-magnon exchange scattering. However, the three-magnon scattering probability, as opposed to the four-magnon exchange scattering probability, is a highly anisotropic one and is proportional to $\sin^2 \theta \cos^2 \theta$. If this is the case, one should expect an instability of magnons with θ=0 and θ=π/2.

IV. Generation of THz Radiation.

The interaction of magnons with electromagnetic radiation was considered in the following reference: M. I. Kaganov and V. M. Tsukernik, Sov. Phys. -JETP 37, 587 (1960). Merging of two magnons with wave vectors q and q' generates a photon with wave vector $$\vec{k} = \vec{q} + \vec{q}' \quad \text{(Eq. 25)}$$

and with frequency $v_k$ equal to $$\omega_q + \omega_{q'} = v_k = ck, \quad \text{(Eq. 26)}$$

where c is the light velocity.

It follows from these conservation laws that k is much smaller than q, i.e. $\vec{q} = -\vec{q}'$.

Using the results of the same reference: M. I. Kaganov and V. M. Tsukernik, Sov. Phys. -JETP 37, 587 (1960), one can derive the rate of the change of the photon distribution function, n(v) in the following way:

$$dn(v)/dt = \quad \text{(Eq. 27)}$$
$$W \int d\theta \cdot \sin^5\theta [N^2(v/2, \theta) \cdot (n(v)+1) - n(v)(N(v/2, \theta)+1)^2] - \frac{n(v) - n^{(0)}(v)}{\tau_{ph}},$$

Here $$W = \frac{\mu^2 q_0^3}{2\hbar} \cdot \left(\frac{4\pi g \mu M_s}{\hbar v}\right)^2, \quad \text{(Eq. 28)}$$

where $\mu$ is the Bohr magneton. The last term in the (Eq. 27) describes the relaxation of generated photons, and $\tau_{ph}$ is the photon relaxation time.

For EuO, with $q_0$=2.6×10 cm$^{-1}$, $\hbar v$=1.5 meV, and $4\pi M^s$=24×10$^3$ Gs, one obtains W≈2×10$^7$ sec$^{-1}$.

If the magnon distribution function is isotropic, one can perform the integration in Eq. (27) and one gets the following equation:

$$dn(v)/dt = \quad \text{(Eq. 29)}$$
$$(16/15) \cdot W \cdot [N^2(v/2) - 2n(v) \cdot N(v/2) - n(v)] - \frac{n(v) - n^{(0)}(v)}{\tau_{ph}}.$$

By analyzing this equation, it is clear that at the initial stage of generation, when n is smaller than N, the number of photons increases as $N^2$, provided the photon relaxation is sufficiently small. With the increase of n, the negative terms in Eq. (29) become significant, and the photons reach a steady state, with dn/dt=0. If this is the case, we have the following expression for the number of photons n at the steady state:

$$n = \frac{n^{(0)} + w\tau_{ph} N^2}{1 + (2N+1)w\tau_{ph}}, \quad \text{(Eq. 30)}$$

where w=16W/15.

If $w\tau_{ph}$ is large, $w\tau_{ph} \gg 1/N$, the number of photons is as follows:

$$n = \frac{N^2}{2N+1} \approx \frac{N}{2}. \quad \text{Eq. (31)}$$

If, on the other hand, $1/N^2 \ll w\tau_{ph} \ll 1/N$, the number of photons is as follows:

$$n = w\tau_{ph} N^2, 1 \ll n \ll N. \quad \text{Eq. (32)}$$

Finally, if the relaxation of photons is very fast, $w\tau_{ph} N^2 \ll 1$, the pumping is inefficient, and $$n \approx n^{(0)}. \quad \text{Eq. (33)}$$

V. Applicable Materials.

The magnon gain medium of the present invention can be implemented by selecting any material that supports generation of substantial number of nonequilibrium magnons that by merging into photons generate THz photons. For example, ferromagnetic semiconductors (europium chalcogenides and chalcogenide spinels), and/or ferromagnetic isolators, can be used to implement the magnon gain medium of the present invention.

VI. Pumping Methods.

Any method that can generate substantial number of nonequilibrium electrons that could rapidly emit nonequilibrium magnons could be used for the purposes for the present invention. For example, laser pumping of polarized electrons, injection of polarized electrons, etc. In addition, injection of non-polarized electrons can be also used for the purposes for the present invention.

VII. Apparatus for Generation of THZ Waves.

Figure 3:
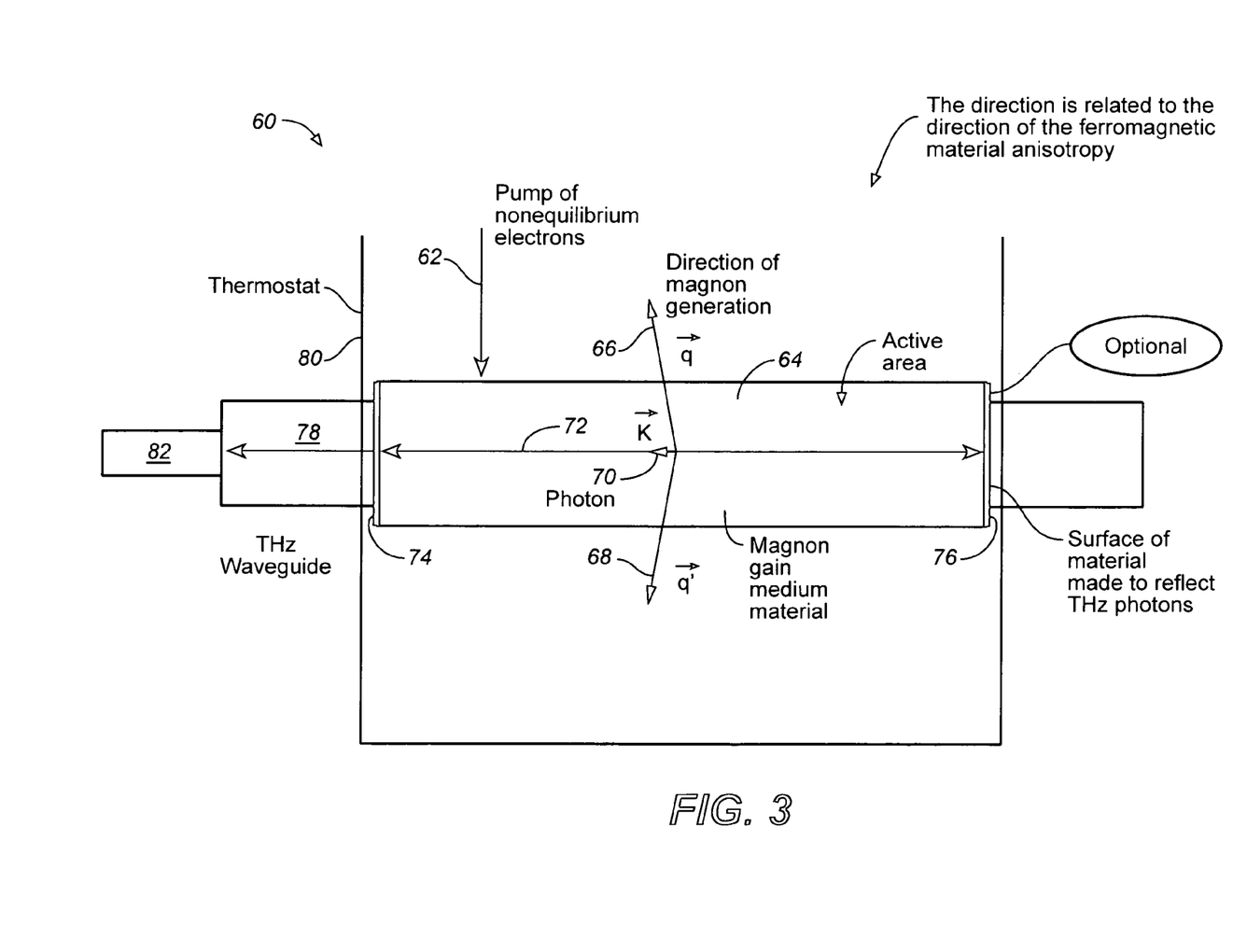
FIG. 3 illustrates the apparatus of the present invention for generation of THz photons.

In one embodiment of the present invention, FIG. 3 illustrates the apparatus 60 for generation of THz waves having the following elements: a magnon gain medium 64 including a material that supports generation of substantial number of nonequilibrium magnons, a pumping source 62 configured to pump nonequilibrium electrons into the magnon gain medium 64, an optical resonator 74-76 configured to accumulate generated THz photons, and configured to release the generated THz photons exceeding the threshold photon density, and a THz waveguide 78 configured to output the generated THz photons.

In one embodiment of the present invention, the optical resonator 74-76 comprises polished surfaces of magnon gain medium 76 and 74, or additional mirrors (not shown) configured to contain THz photons up to the threshold density of THz photons. At the threshold density, the THz photons are released from the magnon gain medium 64 into the THz waveguide 78.

In one embodiment of the present invention, the THz photons released from the magnon gain medium 64 into the THz waveguide 78 can be accumulated in the optical cavity 82.

In one embodiment of the present invention, the optical cavity comprises an optical resonator. In one embodiment of the present invention, the optical resonator comprises a Fabry-Perot cavity, a distributed feedback (DFB) cavity, or a distributed Bragg reflector (DBR).

In one embodiment of the present invention, the magnon gain medium 64 is placed in a thermostat 80 that keeps the operational temperature T below the critical temperature $T_c$. For instance, for EuO, the thermostat 80 keeps the EuO sample at temperature T below its Curie temperature: $T < T_c = 70K$.

VIII. Method for Generation of THz Waves.

In one embodiment, the steps of the method of the present invention for THz photon generation can be performed by using the above-disclosed apparatus 60 (of FIG. 3) of the present invention.

In one embodiment, the method of the present invention for photon generation comprises the following steps (not shown): (A) providing a magnon gain medium; wherein the magnon gain medium supports generation of nonequilibrium magnons; and (B) generating the nonequilibrium magnons in the magnon gain medium; wherein interaction between the nonequilibrium magnons causes generation of photons.

In one embodiment of the present invention, the step (A) further comprises: (A1) placing the magnon gain medium 64 in the thermostat 80 to maintain temperature of the magnon gain medium below a critical temperature. This step is herein illustrated by using the apparatus 60 (of FIG. 3) of the present invention.

In one embodiment of the present invention, the step (A) further comprises: (A2) selecting the magnon gain medium from the group consisting of: {ferromagnetic semiconductor; ferromagnetic isolator; and ferromagnetic material}.

In one embodiment of the present invention, the step (A2) further comprises: (A2, 1) placing the magnon gain medium comprising the selected ferromagnetic material in the thermostat to maintain temperature of the selected ferromagnetic material below its Curie temperature.

Indeed, in general, to achieve the generation of photons, it is sufficient to generate nonequilibrium magnons in a magnon gain medium, and to merge the generated nonequilibrium magnons.

More specifically, in one embodiment of the present invention, the step (B) of generating the nonequilibrium magnons in the magnon gain medium comprises: (B1) injecting nonequilibrium electrons into the magnon gain medium; wherein propagation of the nonequilibrium electrons in the magnon gain medium causes generation of the nonequilibrium magnons. Please, see the given above detailed equations Eqs. (1-24) that describe how the propagation of the nonequilibrium electrons in the magnon gain medium causes generation of nonequilibrium magnons.

In one embodiment of the present invention, the step (B1) further comprises pumping nonequilibrium electrons by using the source of electrons 62 (of FIG. 3).

In another embodiment of the present invention, the step (B1) further comprises pumping substantially sufficient number of polarized nonequilibrium electrons into the magnon gain medium to cause generation of the nonequilibrium magnons in the magnon gain medium. In one more embodiment of the present invention, the step (B1) further comprises pumping a threshold number of polarized nonequilibrium electrons into the magnon gain medium, wherein the threshold number of pumped polarized nonequilibrium electrons is substantially sufficient to generate a magnon avalanche effect in the magnon gain medium. Please see Eqs. (12-14).

In one embodiment of the present invention, the step (B1) further comprises changing a maximum frequency of the generated photons by changing critical temperature of the magnon gain medium; wherein the critical temperature of the magnon gain medium depends on an external parameter; and wherein the external parameter is selected from the group consisting of: {an external pressure; and a concentration of impurities in the magnon gain medium}.

Indeed, for instance, the Curie temperature of EuO can be changed by applying an external pressure, and/or by doping EuO with certain impurities. Please, see M. W. Shafer and T. R. McGuire, J. Appl. Phys., 39, 588 (1968).

In one embodiment of the present invention, the step (B1) further comprises changing a n operating frequency of the generated photons; wherein the operating frequency of the generated photons depends on an external parameter; and wherein the external parameter is selected from the group consisting of: {energy of the injected electrons; and an operating temperature of the thermostat}.

From the given above equations Eqs. (1-24) one can deduct that an operating frequency of the generated photons depends to some extent on the energy of the injected electrons. In addition, an operating frequency of the generated photons also depends on operating temperature of the thermostat according to the according to the following relationship $\hbar\omega = Dq^2 = 2D\hbar^{-1} m\Delta$ and according to the following equation Eq. (34):

$$\Delta = 2I\langle S_z\rangle. \quad \text{Eq. (34)}$$

In one embodiment of the present invention, the step (B1) further comprises: (B2) generating THz photons by using a merging process between the nonequilibrium magnons in the magnon gain medium.

The given above detailed equations Eqs. (25-34) describe the generation of THz photons by using the merging of two nonequilibrium magnons, and the properties of generated THz photons.

In one embodiment, the method of the present invention further comprises: (C) manipulating photon reflection coefficient of the generated photons at surface area of the magnon gain medium by using reflective and transmission means attached to the surface area of the magnon gain medium. Please, see the apparatus 60 (of FIG. 3) of the present invention.

In one embodiment of the present invention, the step (C) further comprises: (C1) selecting the reflective and transmission means from the group consisting of: {an optical cavity; and a Fabry-Perot cavity}.

In one embodiment of the present invention, the step (C) further comprises: (C2) accumulating the generated photons in the magnon gain medium by using the reflective and transmission means attached to the surface area of magnon gain medium. Please, see the apparatus 60 (of FIG. 3) of the present invention.

In one embodiment of the present invention, the step (C2) further comprises accumulating a threshold number of the generated photons in the magnon gain medium, wherein the threshold number of accumulated photons is substantially sufficient for nonlinear photon-photon interaction process. If this is the case, and if the nonequilibrium magnons generate photons having basic frequency $v_{basic}$, the nonlinear photon-photon interaction process can lead to generation of photons having $v_{2basic}$, $v_{3basic}$, $v_{4basic}$, and so on.

In one embodiment, the method of the present invention further comprises: (D) utilizing a waveguide (78 of FIG. 3) attached to the magnon gain medium (64 of FIG. 3) to output the generated photons outside the magnon gain medium.

In one embodiment of the present invention, the step (D) further comprises: (D1) accumulating the generated photons in an outside optical cavity (82 of FIG. 3) attached to the waveguide.

In one embodiment of the present invention, the step (D) further comprises: (D2) accumulating a threshold number of generated photons in the outside optical cavity attached to the waveguide, wherein the threshold number of accumulated photons is substantially sufficient for nonlinear photon-photon interaction process (not shown).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents

What is claimed is:

1. A method of photon generation comprising:
    (A) providing a magnon gain medium; wherein said magnon gain medium supports generation of nonequilibrium magnons; and
    (B) generating said nonequilibrium magnons in said magnon gain medium;
    wherein interaction between said nonequilibrium magnons causes generation of photons.

2. The method of claim 1, wherein said step (A) further comprises:
    (A1) placing said magnon gain medium in a thermostat to maintain temperature of said magnon gain medium below a critical Curie temperature.

3. The method of claim 1, wherein said step (A) further comprises:

(A2) selecting said magnon gain medium from the group consisting of: {ferromagnetic semiconductor; ferromagnetic isolator; and ferromagnetic material}.

4. The method of claim 3, wherein said step (A2) further comprises:
(A2, 1) placing said magnon gain medium comprising said selected ferromagnetic material in said thermostat to maintain temperature of said selected ferromagnetic material below its Curie temperature.

5. The method of claim 1, wherein said step (B) further comprises:
(B1) injecting nonequilibrium electrons into said magnon gain medium;
wherein propagation of said nonequilibrium electrons in said magnon gain medium causes generation of said nonequilibrium magnons; and wherein interaction between said nonequilibrium magnons causes generation of photons.

6. The method of claim 5, wherein said step (B1) further comprises:
(B1, 1) pumping nonequilibrium electrons into said magnon gain medium.

7. The method of claim 5, wherein said step (B1) further comprises:
(B1, 2) pumping polarized nonequilibrium electrons into said magnon gain medium.

8. The method of claim 5, wherein said step (B1) further comprises:
(B1, 3) pumping substantially sufficient number of polarized nonequilibrium electrons into said magnon gain medium to cause generation of said nonequilibrium magnons in said magnon gain medium.

9. The method of claim 5, wherein said step (B1) further comprises:
(B1, 4) pumping a threshold number of polarized nonequilibrium electrons into said magnon gain medium, wherein said threshold number of pumped polarized nonequilibrium electrons is substantially sufficient to generate a magnon avalanche effect in said magnon gain medium.

10. The method of claim 5, wherein said step (B1) further comprises:
(B1, 5) changing a maximum frequency of said generated photons by changing a magnon stiffness D; wherein said magnon stiffness D depends on critical Curie temperature of said magnon gain medium; and wherein critical Curie temperature of said magnon gain medium depends on a concentration of impurities in said magnon gain medium.

11. The method of claim 5, wherein said step (B1) further comprises:
(B1, 6) changing an operating frequency of said generated photons;
wherein said operating frequency of said generated photons depends on an external parameter; and wherein said external parameter is selected from the group consisting of: {energy of said injected electrons; and an operating temperature of said thermostat}.

12. The method of claim 1, wherein said step (B) further comprises:
(B2) generating THz photons by using a merging process between said nonequilibrium magnons in said magnon gain medium.

13. The method of claim 1 further comprising:
(C) manipulating reflection coefficient of surface area of said magnon gain medium by using reflective and transmission means attached to said surface area of said magnon gain medium to manipulate the number of photons being reflected by said surface area of said magnon gain medium.

14. The method of claim 13, wherein said step (C) further comprises:
(C1) selecting said reflective and transmission means from the group consisting of: {an optical cavity; and a Fabry-Perot cavity}.

15. The method of claim 13, wherein said step (C) further comprises:
(C2) accumulating said generated photons in said magnon gain medium by using said reflective and transmission means attached to said surface area of magnon gain medium.

16. The method of claim 15, wherein said step (C2) further comprises:
(C2, 1) accumulating a threshold number of said generated photons in said magnon gain medium, wherein said threshold number of accumulated photons is substantially sufficient for nonlinear photon-photon interaction process.

17. The method of claim 16, wherein said step (C2, 1) further comprises:
(C2, 1, 1) changing the frequency of said generated photons by using said nonlinear photon-photon interaction process.

18. The method of claim 1 further comprising:
(D) utilizing a waveguide attached to said magnon gain medium to output said generated photons outside said magnon gain medium.

19. The method of claim 18, wherein said step (D) further comprises:
(D1) accumulating said generated photons in an outside optical cavity attached to said waveguide.

20. The method of claim 18, wherein said step (D) further comprises:
(D2) accumulating a threshold number of said generated photons in said outside optical cavity attached to said waveguide, wherein said threshold number of accumulated photons is substantially sufficient for nonlinear photon-photon interaction process.

21. The method of claim 20, wherein said step (D2) further comprises:
(D2, 1) changing the frequency of said generated photons by using said nonlinear photon-photon interaction process.

22. The method of claim 1, wherein said step (A) further comprises:
(A3) providing said magnon gain medium; wherein said magnon gain medium includes a conduction (valence band) that splits into two subbands, and wherein said first subband is configured to be populated by electrons having spin up, and wherein said orientation of spin up is an orientation directed along a direction of a magnetization of said magnon gain medium; and wherein said second subband is configured to be populated by electrons having spin down, and wherein said orientation of spin down is an orientation directed opposite to said direction of said magnetization of said magnon gain medium.

23. The method of claim 1, wherein said step (A) further comprises:
(A4) providing said magnon gain medium; wherein said magnon gain medium includes said conduction (valence band) that splits into said two subbands, and wherein said first subband is configured to be populated by electrons having spin up; and wherein said second subband is configured to be populated by electrons having spin down; and wherein said two subbands with said spin up and said spin down are separated by an exchange gap.

24. The method of claim 1, wherein said step (A) further comprises:
(A5) providing said magnon gain medium; wherein said magnon gain medium includes said conduction (valence band) that splits into said two subbands, and wherein said first subband is configured to be populated by electrons having spin up; and wherein said second subband is configured to be populated by electrons having spin down; and wherein said two subbands with said spin up and said spin down are separated by said exchange gap; and wherein if an exchange energy is positive then a bottom of said subband with said spin up is located below a bottom of said subband with said spin down.

25. The method of claim 1, wherein said step (A) further comprises:
(A6) providing said magnon gain medium; wherein said magnon gain medium includes said conduction (valence band) that splits into said two subbands, and wherein said first subband is configured to be populated by electrons having spin up; and wherein said second subband is configured to be populated by electrons having spin down; and wherein said two subbands with said spin up and said spin down are separated by said exchange gap; and wherein if said exchange energy is positive then said bottom of said subband with said spin up is located below said bottom of said subband with said spin down; and if said gap $\Delta$ is much larger than the maximum of $\{T, Ef\}$, wherein T is temperature of said magnon gain medium, and wherein Ef is a Fermi energy of electrons, then only the electron states in said lower subband with spin up are occupied in equilibrium, i.e. the electrons are fully polarized.

26. The method of claim 1, wherein said step (A) further comprises:
(A7) providing said magnon gain medium; wherein said magnon gain medium includes said conduction (valence band) that splits into said two subbands, and wherein said first subband is configured to be populated by electrons having spin up; and wherein said second subband is configured to be populated by electrons having spin down; and wherein said two subbands with said spin up and said spin down are separated by said exchange gap; and wherein if said exchange energy is negative then said bottom of said subband with said spin up is located above said bottom of said subband with said spin down.

* * * * *